Sept. 13, 1932. J. W. PLATT 1,877,529
GAS VALVE LOCKING ATTACHMENT
Filed March 14, 1930

Inventor
John W. Platt.
By his Attorney
H. G. Manning

Patented Sept. 13, 1932

1,877,529

UNITED STATES PATENT OFFICE

JOHN W. PLATT, OF WATERVILLE, CONNECTICUT

GAS VALVE LOCKING ATTACHMENT

Application filed March 14, 1930. Serial No. 435,759.

This invention relates to gas valves, and more particularly to a safety locking attachment for preventing the valve cock of a gas range burner from being accidentally turned on.

One object of the present invention is to provide a safety locking attachment of the above nature which may be readily installed without changing the construction of the valve cock or valve casing in any manner.

A further object is to provide a device of the above nature in which the valve will be automatically locked by the operation of turning the handle of the valve cock to the "off" position.

A further object is to provide a device of the above nature which will be simple in construction, inexpensive to manufacture, easy to install and manipulate, compact, ornamental in appearance, and very efficient and durable in use.

With these and other objects in view there have been illustrated on the accompanying drawing two forms in which the invention may be conveniently embodied in practice.

Figure 1:
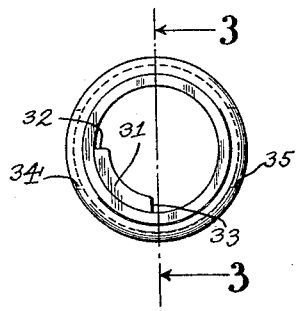
Fig. 1 represents a top plan view of the locking attachment.
Figure 2:
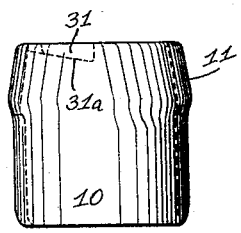
Fig. 2 is a side view of the same.
Figure 3:
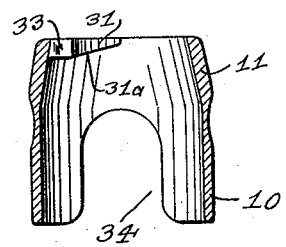
Fig. 3 is a sectional end view of the same, the section being taken along the line 3—3 of Fig. 1, looking in the direction of the arrows.

Referring now to the drawing in which like reference numerals denote corresponding parts throughout the several views, the gas valve locking attachment herein disclosed comprises a short hollow tubular sleeve member having a lower cylindrical section 10 and a short upper frustoconical tapered section 11. The locking attachment is adapted to fit loosely around a vertical valve cock or plug 12 having an enlarged upper socket 13 for receiving a horizontal tapered porcelain hollow handle 14. The handle 14 is adapted to be held in place by a screw rod threaded into the socket 13, said screw rod having a slotted head 15 located outside the larger end 16 of the handle, as clearly shown in Fig. 4.

The vertical valve plug 12 has a reduced bottom section 17 which is surrounded at its lower end by a washer 18 and a helical spring 19, the latter being held under compression between said washer 18 and a second washer 20 adjustably held by a nut 21 screwed upon the lower end of the reduced section 17. The valve plug 12 is fitted within a hollow valve body or casing 22 formed substantially in the shape of a cross and having enlarged upper and lower vertical tapered legs 23 and 24 and a pair of horizontal threaded inner and outer cylindrical pipes 25 and 26. The outer end of the pipe 26 is adapted to be connected to a gas-supply pipe 27, while the inner end 25 is adapted to receive a gas-regulating needle valve member 28.

In order to prevent the rotation of the valve plug 12 beyond the "on" position, the upper leg 23 of the valve casing 22 is provided with an arcuate slot 29 in its upper edge extending ninety degrees around the circumference of said casing, said slot 29 slidably receiving a pin 30 projecting laterally from one side of the valve plug 12.

For the purpose of locking the valve plug 12 in the "off" position, the upper conical section 11 of said sleeve is provided on its interior edge with an arc-shaped lug 31, said lug having its upper surface flush with the top of the sleeve and having a beveled lower surface 31a inclined downwardly from top to bottom in an outward direction. The lug 31 has a pair of radial end shoulders 32 and 33 adapted to engage the pin 30 and the end of the slot 29 respectively when the plug 12 has been swung to the "off" position.

Figure 4:
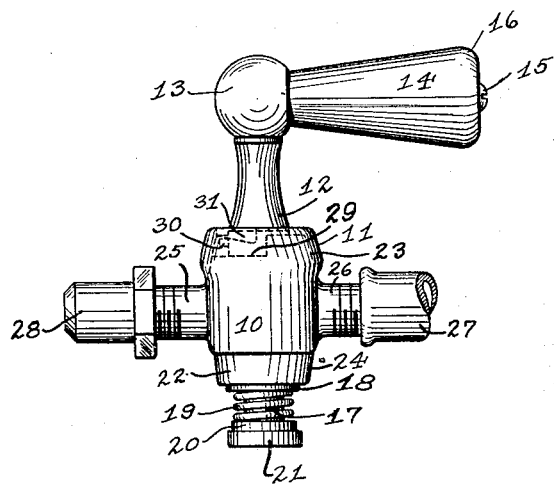
Fig. 4 is a side view of a gas valve cock and casing with the locking attachment shown in operating position, the valve being in the "on" position.
Figure 5:
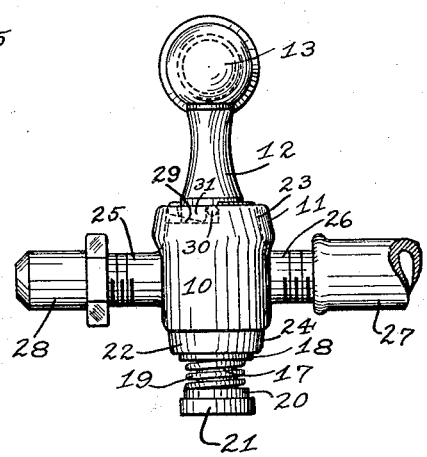
Fig. 5 is a view similar to Fig. 4, but with the valve locked in the "off" position.

The angle subtended by the arcuate lug 31 is somewhat less than 90 degrees so that a space will be left between the shoulder 32 and the right-hand end of the arcuate slot 29, as viewed in Figs. 4 and 5, sufficiently large to just receive the pin 30 of the plug 12 when the handle has been swung to the "off" position, thereby locking the valve cock from being accidentally turned on.

In order to prevent the locking sleeve from rotating with the plug 12, the lower cylindrical section 10 of the locking sleeve is provided with a pair of semi-circular recesses 34 and 35 shaped to fit over the pipe sections 25 and 26 respectively.

Operation

In operation, when it is desired to place the locking sleeve upon the gas valve, the plug 12 will first be removed from the casing 22 and the sleeve pushed upwardly around said plug from below. The plug will then be inserted in operating position within the casing 22, and the sleeve twisted to permit the slots 34 and 35 to drop over the pipe ends 25 and 26 respectively, as shown in Fig. 4. When the handle is turned to the "off" position, the sleeve will drop by gravity a further distance causing the lug 31 to enter and substantially fill the slot 29 and positively lock the valve plug 12 against accidentally being turned on.

When it is desired to turn on the gas, it will only be necessary for the operator to lift the locking sleeve upwardly, using the fingers of one hand, until the lug 31 has become disengaged from the slot 29. The valve handle 14 may then be turned from the "off" position shown in Fig. 5 to the "on" position shown in Fig. 4, the sleeve attachment remaining in the unlocked raised position shown in Fig. 4 as long as the gas valve is open.

To again close the valve, the operator will move the handle 14 from the open position shown in Fig. 4 to the closed position shown in Fig. 5, it being unnecessary to touch the locking sleeve which will drop by gravity into the "off" position, the lug 31 then lying in the slot 29 in interlocking engagement with the pin 30. In this position the locking sleeve will prevent the valve from accidentally being opened.

Figure 6:
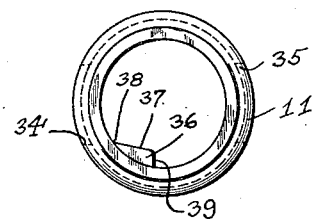
Fig. 6 is a top plan view of a modified form of valve locking attachment.

In the modified form of the invention shown in Fig. 6 a locking sleeve is disclosed having a locking lug 36, which instead of being arc-shaped as in the first form of the invention, is wedge-shaped in plan view, having a straight inner edge 37 intersecting the circular inner periphery of the upper section of the sleeve at a point 38. The lug 36 also has a shoulder 39 corresponding to the shoulder 33 of the first form of lug 31. The upper surface of the lug 36 is flush with the upper surface of the sleeve, and the under surface of said lug is outwardly tapered, as in the first form of locking sleeve.

It will be understood that if desired, the locking sleeve may be made inoperative by raising it upwardly and rotating it with respect to the valve body. When in this position, the valve may be turned on and off independently of the locking sleeve.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a gas valve, a casing having an arcuate slot in its upper edge, a valve plug rotatable in said casing and having a lateral pin partially filling said slot, a rotatable tubular locking member surrounding said valve plug and substantially embracing said casing, said locking member having an interior lug at its upper edge adapted to drop by gravity into said slot, said lug filling substantially the remainder of said slot to lock said valve plug in the "off" position.

2. In a gas valve, a casing having an arcuate slot in its upper edge, a valve plug rotatable in said casing and having a lateral pin partially filling said slot, a rotatable tubular locking member surrounding said valve plug and substantially embracing said casing, said locking member having an interior lug at its upper edge adapted to drop by gravity into said slot, said lug filling substantially the remainder of said slot to lock said valve plug in the "off" position, said lug being flush with the top of said tubular member.

3. In a gas valve, a casing having an arcuate slot in its upper edge, a valve plug rotatable in said casing and having a lateral pin partially filling said slot, a rotatable tubular locking member surrounding said valve plug and substantially embracing said casing, said locking member having an interior lug at its upper edge adapted to drop by gravity into said slot, said lug filling substantially the remainder of said slot to lock said valve plug in the "off" position, said lug having a radial shoulder at one end.

4. In a gas valve, a casing having an arcuate slot in its upper edge, a valve plug rotatable in said casing and having a lateral pin partially filling said slot, a rotatable tubular locking member surrounding said valve plug and substantially embracing said casing, said locking member having an interior lug at its upper edge adapted to drop by gravity into said slot, said lug filling substantially the remainder of said slot to lock said valve plug in the "off" position, said lug having radial shoulders at its extremities.

5. In a gas valve, a casing having an arcuate slot in its upper edge, a valve plug rotatable in said casing and having a lateral pin partially filling said slot, a rotatable tubular locking member surrounding said valve plug and substantially embracing said casing, said locking member having an interior lug at its upper edge adapted to drop by gravity into said slot, said lug filling substantially the remainder of said slot to lock said valve plug in the "off" position, the under surface of said lug being inclined outwardly.

6. In a gas valve, a casing having an arcuate slot in its upper edge, a valve plug rotatable in said casing and having a lateral pin partially filling said slot, a rotatable tubular locking member surrounding said valve plug, said locking member having an interior lug adapted to drop by gravity into said slot, said lug filling substantially the remainder of said slot to lock said valve plug in the "off" position, said lug being wedge-shaped in plan view and having a straight inner edge.

7. In a gas valve, a casing having an arcuate slot in its upper edge, a valve plug rotatable in said casing and having a lateral pin in said slot, a rotatable tubular locking member surrounding said valve plug and having depending means for detachably engaging the sides of said casing to normally prevent rotation of said tubular locking member, and means on said locking member projecting into said slot for engaging said pin to lock the valve plug in the "off" position.

In testimony whereof, I have affixed my signature to this specification.

JOHN W. PLATT.